United States Patent [19]

Anderson et al.

[11] Patent Number: 5,326,391

[45] Date of Patent: Jul. 5, 1994

[54] MICROPOROUS MATERIAL EXHIBITING INCREASED WHITENESS RETENTION

[75] Inventors: Barbara J. Anderson, Saltsburg, Pa.; Paul L. Benenati, Copley, Ohio; Harlan B. Johnson, Pittsburgh, Pa.; Thomas A. Rechlicz, Lake Charles, La.; William A. Williams, Latrobe, Pa.

[73] Assignee: PPG Industries, Inc., Pittsburgh, Pa.

[21] Appl. No.: 977,351

[22] Filed: Nov. 18, 1992

[51] Int. Cl.$^5$ .......................... C08K 7/22; C04B 16/08
[52] U.S. Cl. ..................................... 106/409; 106/400; 106/401; 8/115.65; 428/317.9
[58] Field of Search ........................ 106/409, 400, 401; 8/115.65; 428/317.9

[56] References Cited

U.S. PATENT DOCUMENTS

| | | | |
|---|---|---|---|
| 3,215,487 | 11/1965 | Cappuccio et al. | 8/115.65 |
| 3,300,272 | 1/1967 | Robinson | 8/115.65 |
| 3,361,718 | 1/1968 | Fujimoto et al. | 525/55 |
| 3,438,955 | 4/1969 | Rombusch et al. | 524/166 |
| 3,775,051 | 11/1973 | Graff | 8/115.6 |
| 3,891,718 | 6/1975 | Wolf et al. | 524/220 |
| 3,922,249 | 11/1975 | Mills | 524/120 |
| 3,962,176 | 6/1976 | Bernert et al. | 524/227 |
| 4,283,192 | 8/1981 | Bauman | 8/137 |
| 4,822,529 | 4/1989 | Saiki et al. | 554/481 |
| 5,035,886 | 7/1991 | Chakrabarti et al. | 424/78 |

FOREIGN PATENT DOCUMENTS

| | | |
|---|---|---|
| 0394689A2 | 10/1990 | European Pat. Off. . |
| 0224060 | 6/1985 | German Democratic Rep. ................................. 8/115.65 |
| 1-263136 | 10/1989 | Japan . |
| 341807 | 8/1972 | U.S.S.R. . |

OTHER PUBLICATIONS

"Antistatic Composition for Textiles and Plastics", K. Johnson, Noyes Data Corp., New Jersey, 1976, pp. 149, 150, 250, 251. TS 1449 R333 (Au1105).
R. S. Solvik et al, "Control of yellowing in TiO$_2$-pigmented HDPE", Modern Plastics, Jan. 1974, pp. 78–82.
W-H. Hemmpel, "Yellowing of textiles during storage—possible causes and preventative measures", International Textile Bulletin—Dyeing/Printing/Finishing, v. 31, 3rd Quarter, 1985, pp. 21–24.
V. S. Salvin et al, "Yellowingh of White Fabrics due to Air Pollutants" University of North Carolina at Greensboro, pp. 40–51. (no date).
R. K. Iler, *The Chemistry of Silica*, John Wiley and Sons, (1979), pp. 570–573; 680–681; 686–687; 706–707.
"Barrier Materials, Flexible, Electrostatic Portective, Heat Sealable", Military Specification MIL-B-81705C, pp. 1–31, 1989.

*Primary Examiner*—Anthony Green
*Assistant Examiner*—Scott L. Hertzog
*Attorney, Agent, or Firm*—George D. Morris

[57] ABSTRACT

The tendency of microporous material to discolor over a period of time when exposed to the atmosphere during normal usage can be reduced if the microporous material comprises whiteness retaining organic surface active agent.

22 Claims, No Drawings

MICROPOROUS MATERIAL EXHIBITING INCREASED WHITENESS RETENTION

Microporous materials comprising thermoplastic organic polymer, large proportions of siliceous particles, and large void volumes are known and have many valuable properties. Such microporous materials are durable and many of them are particularly useful as printing substrates.

One problem with these microporous materials has been that they tend to discolor over a period of time when exposed to the atmosphere during normal usage. It has now been found that the tendency to discolor can be reduced if the microporous material comprises whiteness retaining organic surface active agent.

Accordingly, in microporous material which on a coating-free, printing ink-free, and impregnant-free basis comprises: (a) a matrix consisting essentially of substantially water insoluble thermoplastic organic polymer, (b) finely divided substantially water-insoluble filler particles, of which at least 50 percent by weight are siliceous particles, the filler particles being distributed throughout the matrix and constituting from 40 to 90 percent by weight of the microporous material, and (c) a network of interconnecting pores communicating substantially throughout the microporous material, the pores constituting from 35 to 95 percent by volume of the microporous material, one embodiment of the invention is the improvement wherein the microporous material comprises whiteness retaining organic surface active agent selected from the group consisting of N,N-bis(2-hydroxyethyl)cocoamide, octyl-dimethyl-2-hydroxyethyl quaternary ammonium methane sulfonate, octyl-dimethyl-2-hydroxyethyl quaternary ammonium dodecylbenzene sulfonate, soya dimethyl ethyl ammonium ethosulfate, polyethyleneglycol (400) monolaurate, stearamidopropyldimethyl-2-hydroxyethylammonium nitrate, dimethyl cocobenzalkonium chloride, and lauramine oxide.

Another embodiment of the invention is a process comprising: (a) spraying a composition comprising whiteness retaining organic surface active agent dissolved or dispersed in liquid diluent onto microporous material which on a coating-free, printing ink-free, and impregnant-free basis comprises: (1) a matrix consisting essentially of substantially water insoluble thermoplastic organic polymer, (2) finely divided substantially water-insoluble filler particles, of which at least 50 percent by weight are siliceous particles, the filler particles being distributed throughout the matrix and constituting from 40 to 90 percent by weight of the microporous material, and (3) a network of interconnecting pores communicating substantially throughout the microporous material, the pores constituting from 35 to 95 percent by volume of the microporous material, and (b) removing the liquid diluent.

The whiteness retaining organic surface active agents are compounds containing both hydrophobic and hydrophilic groups or regions in the molecule. Such surface active agents may be cationic, nonionic, anionic, or amphoteric. The whiteness retaining organic surface active agents have the ability to reduce, retard, or eliminate timewise discolorations such as darkening, browning, yellowing, or the like. They are often, but not necessarily antistats.

The whiteness retaining organic surface active agent may be included with the other components from which the microporous material is made. Alternatively, the whiteness retaining organic surface active agent may be applied topically to previously formed precursor microporous material (i.e., microporous material containing no whiteness retaining organic surface active agent).

One whiteness retaining organic surface active agent or a mixture of whiteness retaining organic surface active agents may be used as desired.

Although it is not desired to be bound by any theory, it is believed that the thermal conditions to which the surface active agent is exposed during manufacture of the microporous material containing the surface active agent is an important factor in respect of the observed effectiveness of the surface active agent in retaining whiteness. In particular the temperatures should be maintained below the thermal decomposition temperature of the organic surface active agent. The superficial appearance of some organic surface active agents to not function well as whiteness retainers is believed to be illusory in that due to the thermal history of the microporous material, it no longer contains any significant amount of organic surface active agent. It is expected that such organic surface active agents would function satisfactorily if the microporous material were exposed to lower temperatures during manufacture and/or use. The thermal conditions under which microporous material is manufactured are generally more severe than those of topical organic antistat application or use. It is therefore expected that organic surface active agents which, when incorporated into the batch prior to extrusion, are not very effective in retaining whiteness, will often be satisfactorily effective if applied topically after microporous material formation.

A simple cigarette smoke exposure test, described below, has been devised to quickly ascertain the whiteness retaining effectiveness of any particular internal or topically applied organic surface active agent when the test sample of microporous material containing the organic surface active agent has been exposed to the typical thermal conditions of manufacture and/or use. Since the test is simple and easy to run, it may be used as a screening test.

When the whiteness retaining organic surface active agent is an integral component of the microporous material (i.e., it is included in the various materials which are used to form the microporous material), it usually constitutes from 0.1 to 10 percent by weight of the microporous material. Often the whiteness retaining organic surface active agent constitutes from 0.2 to 5 percent by weight of the microporous material. From 0.5 to 2.5 percent by weight of tile microporous material is preferred.

When the whiteness retaining organic surface active agent is topically applied whiteness retaining organic surface active agent, it usually constitutes from 0.05 to 10 percent by weight of the microporous material of the invention. Often the topically applied whiteness retaining organic surface active agent constitutes from 0.1 to 5 percent by weight of the microporous material. From 0.2 to 2.5 percent by weight of the microporous material is preferred.

Many known microporous materials may be employed as precursor microporous materials for topical application of the whiteness retaining organic surface active agent according to the present invention. Examples of such microporous materials, processes for making such microporous materials, and their properties are described in U.S. Pat. Nos. 2,772,322; 3,351,495; 3,696,061; 3,725,520; 3,862,030; 3,903,234; 3,967,978; 4,024,323; 4,102,746; 4,169,014; 4,210,709; 4,226,926; 4,237,083; 4,335,193; 4,350,655; 4,472,328; 4,585,604; 4,613,643; 4,681,750; 4,791,144; 4,833,172; 4,861,644; 4,892,779; 4,927,802; 4,872,779; 4,927,802; 4,937,115; 4,957,787; 4,959,208; 5,032,450; 5,035,886; 5,071,645; 5,047,283; and 5,114,438, in U.S. patent application 07/596,175, filed Oct. 10, 1990, and in International Publication No. WO 92/06577. The processes for making the known microporous materials may be modified by including the whiteness retaining organic surface active agent in the various materials which are used to form the microporous material when the whiteness retaining organic surface active agent is to be an integral component of the microporous material of the present invention.

The matrix of the microporous material consists essentially of substantially water-insoluble thermoplastic organic polymer. The numbers and kinds of such polymers suitable for use of the matrix are enormous. In general, substantially any substantially water-insoluble thermoplastic organic polymer which can be extruded, calandared, pressed, or rolled into film, sheet, strip, or web may be used. The polymer may be a single polymer or it may be a mixture of polymers. The polymers may be homopolymers, copolymers, random copolymers, block copolymers, graft copolymers, atactic polymers, isotactic polymers, syndiotactic polymers, linear polymers, or branched polymers. When mixtures of polymers are used, the mixture may be homogeneous or it may comprise two or more polymeric phases. Examples of classes of suitable substantially water-insoluble thermoplastic organic polymers include the thermoplastic polyolefins, poly(halo-substituted olefins), polyesters, polyamides, polyurethanes, polyureas, poly(vinyl halides), poly(vinylidene halides), polystyrenes, poly(vinyl esters), polycarbonates, polyethers, polysulftdes, polyimides, polysilanes, polysiloxanes, polycaprolactones, polyacrylates, and polymethacrylates. Hybrid classes exemplified by the thermoplastic poly(urethane-ureas), poly(ester-amides), poly(silane-siloxanes), and poly(ether-esters) are within contemplation. Examples of suitable substantially water-insoluble thermoplastic organic polymers include thermoplastic high density polyethylene, low density polyethylene, ultrahigh molecular weight polyethylene, polypropylene (atactic, isotactic, or syndiotatic as the case may be), poly(vinyl chloride), polytetrafluoroethylene, copolymers of ethylene and acrylic acid, copolymers of ethylene and methacryltc acid, poly(vinyltdene chloride), copolymers of vinylidene chloride and vinyl acetate, copolymers of vinylidene chloride and vinyl chloride, copolymers of ethylene and propylene, copolymers of ethylene and butene, poly(vinyl acetate), polystyrene, poly(omega-aminoundecanoic acid) poly(hexamethylene adipamide), poly(epsilon-caprolactam), and poly(methyl methacrylate). These listings are by no means exhaustive, but are intended for purposes of illustration. The preferred substantially water-insoluble thermoplastic organic polymers comprise poly(vtnyl chloride), copolymers of vinyl chloride, or mixtures thereof; or they comprise essentially linear ultrahigh molecular weight polyoleftn which is essentially linear ultrahigh molecular weight polyethylene having an intrinsic viscosity of at least 10 deciliters/gram, essentially linear ultrahigh molecular weight polypropylene having an intrinsic viscosity of at least 6 deciliters/gram, or a mixture thereof. Essentially linear ultrahigh molecular weight polyethylene having an intrinsic viscosity of at least 18 deciliters/gram is especially preferred.

Inasmuch as ultrahigh molecular weight (UHMW) polyolefin is not a thermoset polymer having an infinite molecular weight, it is technically classified as a thermoplastic. However, because the molecules are essentially very long chains, UHMW polyolefin, and especially UHMW polyethylene, softens when heated but does not flow as a molten liquid in a normal thermoplastic manner. The very long chains and the peculiar properties they provide to UHMW polyolefin are believed to contribute in large measure to the desirable properties of microporous materials made using this polymer.

As indicated earlier, the intrinsic viscosity of the UHMW polyethylene is at least 10 deciliters/gram. Usually the intrinsic viscosity is at least 14 deciliters/gram. Often the intrinsic viscosity is at least 18 deciliters/gram. In many cases the intrinsic viscosity is at least 19 deciliters/gram. Although there is no particular restriction on the upper limit of the intrinsic viscosity, the intrinsic viscosity is frequently in the range of from 10 to 39 deciliters/gram. The intrinsic viscosity is often in the range of from 14 to 39 deciliters/gram. In most cases the intrinsic viscosity is in the range of from 18 to 39 deciliters/gram. An intrinsic viscosity in the range of from 18 to 32 decillters/gram is preferred.

Also as indicated earlier the intrinsic viscosity of the UHMW polypropylene is at least 6 declitters/gram. In many cases the intrinsic viscosity is at least 7 deciliters/gram. Although there is no particular restriction on the upper limit of the intrinsic viscosity, the intrinsic viscosity is often in the range of from 6 to 18 deciliters/gram. An intrinsic viscosity in the range of from 7 to 16 deciliters/gram is preferred.

As used herein and in the claims, intrinsic viscosity is determined by extrapolating to zero concentration the reduced viscosities or the inherent viscosities of several dilute solutions of the UHMW polyolefin where the solvent is freshly distilled decahydronaphthalene to which 0.2 percent by weight, 3,5-di-tert-butyl-4-hydroxyhydrocinnamic acid, neopentanetetrayl ester [CAS Registry No. 6683-19-8] has been added. The reduced viscosities or the inherent viscosities of the UHMW polyolefin are ascertained from relative viscosities obtained at 135° C. using an Ubbelohde No. 1 viscometer in accordance with the general procedures of ASTM D 4020-81, except that several dilute solutions of differing concentration are employed.

The nominal molecular weight of UHMW polyethylene is empirically related to the intrinsic viscosity of the polymer according to the equation:

$$M = 5.37 \times 10^4 \, [\eta]^{1.37}$$

where M is the nominal molecular weight and $[\eta]$ is the intrinsic viscosity of the UHMW polyethylene expressed in dectitters/gram. Similarly, the nominal molecular weight of UHMW polypropylene is empirically related to the intrinsic viscosity of the polymer according to the equation:

$$M = 8.88 \times 10^4 \, [\eta]^{1.25}$$

where M is the nominal molecular weight and $[\eta]$ is the intrinsic viscosity of the UHMW polypropylene expressed in deciliters/gram.

The essentially linear ultrahigh molecular weight polypropylene is most frequently essentially linear ultrahigh molecular weight isotactic polypropylene. Often the degree of isotacicity of such polymer is at least 95 percent, while preferably it is at least 98 percent.

When used, sufficient UHMW polyolefin should be present in the matrix to provide its properties to the microporous material. Other thermoplastic organic polymer may also be present in the matrix so long as its presence does not materially affect the properties of the microporous material in an adverse manner. The amount of the other thermoplastic polymer which may be present depends upon the nature of such polymer. In general, a greater amount of other thermoplastic organic polymer may be used if the molecular structure contains little branching, few long sidechains, and few bulky side groups, than when there is a large amount of branching, many long sidechains, or many bulky side groups. For this reason, the preferred thermoplastic organic polymers which may optionally be present are low density polyethylene, high density polyethylene, poly(tetrafluoroethylene), polypropylene, copolymers of ethylene and propylene, copolymers of ethylene and acrylic acid, and copolymers of ethylene and methacrylic acid. If desired, all or a portion of the carboxyl groups of carboxyl-containing copolymers may be neutralized with sodium, zinc, or the like. It is our experience that usually at least about one percent UHMW polyolefin, based on the weight of the matrix, will provide the desired properties to the microporous material. At least 3 percent UHMW polyolefin by weight of the matrix is commonly used. In many cases at least 10 percent by weight of the matrix ts UHMW polyolefin. Frequently at least 50 percent by weight of the matrix is UHMW polyolefin. In many instances at least 60 percent by weight of the matrix is UHMW polyolefin. Sometimes at least 70 percent by weight of the matrix is UHMW polyolefin. In some cases the other thermoplastic organic polymer is substantially absent.

In a preferred embodiment the matrix comprises a mixture of substantially linear ultrahigh molecular weight polyethylene having an intrinsic viscosity of at least 10 deciliters/gram and lower molecular weight polyethylene having an ASTM D 1238-86 Condition E melt index of less than 50 grams/10 minutes and an ASTM D 1238-86 Condition F melt index of at least 0.1 gram/10 minutes. The nominal molecular weight of the lower molecular weight polyethylene (LMWPE) is lower than that of the UHMW polyethylene. LMWPE is thermoplastic and many different types are known. One method of classification is by density, expressed in grams/cubic centimeter and rounded to the nearest thousandth, in accordance with ASTM D 1248-84 (Reapproved 1989):

TABLE 1

| Type | Abbreviation | Density, g/cm³ |
|---|---|---|
| Low Density Polyethylene | LDPE | 0.910—0.925 |
| Medium Density Polyethylene | MDPE | 0.926—0.940 |
| High Density Polyethylene | HDPE | 0.941—0.965 |

Any or all of these polyethylenes may be used as the LMWPE in the present invention. HDPE, however, is preferred because it ordinarily tends to be more linear than MDPE or LDPE.

The ASTM D 1238-86 Condition E (that is, 190° C. and 2.16 kilogram load) melt index of the LMWPE is less than 50 grams/10 minutes. Often the Condition E melt index is less than 25 grams/10 minutes. Preferably the Condition E melt index is less than 15 grins/10 minutes.

The ASTM D 1238-86 Condition F (that is, 190° C. and 21.6 kilogram load) melt index of the LMWPE is at least 0.1 gram/10 minutes. In many cases the Condition F melt index is at least 0.5 gram/10 minutes. Preferably the Condition F melt index is at least 1.0 gram/10 minutes.

It is especially preferred that the UHMW polyethylene constitute at least one percent by weight of the matrix and that the UHMW polyethylene and the LFfWPE together constitute substantially 100 percent by weight of the polymer of the matrix.

As present in the microporous material, the finely divided substantially water-insoluble siliceous particles may be in the form of ultimate particles, aggregates of ultimate particles, or a combination of both. In most cases, at least 90 percent by weight of the siliceous particles used in preparing the microporous material have gross particle sizes in the range of from 5 to 40 micrometers as determined by use of a Model TAII Coulter counter (Coulter Electronics, Inc.) according to ASTM C 690-80 but modified by stirring the filler for 10 minutes in Isoton II electrolyte (Curtin Matheson Scientific, Inc.) using a four-blade, 4,445 centimeter diameter propeller stirrer. Preferably at least 90 percent by weight of the siliceous particles have gross particle sizes in the range of from 10 to 30 micrometers. It is expected that the sizes of filler agglomerates may be reduced during processing of the ingredients to prepare the microporous material. Accordingly, the distribution of gross particle sizes in the microporous material may be smaller than in the raw siliceous filler itself.

Examples of suitable siliceous particles include particles of silica, mica, montmorillonite, kaolinite, asbestos, talc, diatomaceous earth, vermiculite, natural and synthetic zeolites, cement, calcium silicate, aluminum silicate, sodium aluminum silicate, aluminum polysilicate, altunina silica gels, and glass particles. Silica and the clays are the preferred siliceous particles. Of the silicas, precipitated silica, silica gel, or fumed silica is most often used.

In addition to the siliceous particles, finely divided substantially water-insoluble non-siliceous filler particles may also be employed. Examples of such optional non-siliceous filler particles include particles of titanium oxide, iron oxide, copper oxide, zinc oxide, antimony oxide, zirconia, magnesia, alumina, molybdenum disulfide, zinc sulfide, barium sulfate, strontium sulfate, calcium carbonate, magnesium carbonate, magnesium hydroxide, and finely divided substantially water-insoluble flame retardant filler particles such as particles of ethylenebis(tetra-bromophthalimide), octabromodiphenyl oxide, decabromodiphenyl oxide, and ethylenebisdibromonorbornane dicarboximide.

As present in the microporous material, the finely divided substantially water-insoluble non-siliceous filler particles may be in the form of ultimate particles, aggregates of ultimate particles, or a combination of both. In most cases, at least 75 percent by weight of the non-siliceous filler particles used in preparing the microporous material have gross particle sizes in the range of from 0.1 to 40 micrometers as determined by use of a Micromeretics Sedigraph 5000-D (Micromeretics Instrument Corp.) in accordance with the accompanying operating manual. The preferred ranges vary from filler to filler. For example, it is preferred that at least 75 percent by weight of antimony oxide particles be in the range of from 0.1 to 3 micrometers, whereas it is preferred that at least 75 percent by weight of barium sulfate particles be in the range of from 1 to 25 micrometers. It is expected that the sizes of filler agglomerates may be reduced during processing of the ingredients to prepare the microporous material. Therefore, the distribution of gross particle sizes in the microporous material may be smaller than in the raw non-siliceous filler itself.

The particularly preferred finely divided substantially water-insoluble siliceous filler particles are precipitated silica. Although both are silicas, it is important to distinguish precipitated silica from silica gel inasmuch as these different materials have different properties. Reference in this regard is made to R. K. Iler, *The Chemistry of Silica*, John Wiley & Sons, New York (1979), Library of Congress Catalog No. QD 181.S6144. Note especially pages 15-29, 172-176, 218-233, 364-365, 462-465, 554-564, and 578-579. Silica gel is usually produced commercially at low pH by acidifying an aqueous solution of a soluble metal silicate, typically sodium silicate, with acid. The acid employed is generally a strong mineral acid such as sulfuric acid or hydrochloric acid although carbon dioxide is sometimes used. Inasmuch as there is essentially no difference in density between the gel phase and the surrounding liquid phase while the viscosity is low, the gel phase does not settle out, that is to say, it does not precipitate. Silica gel, then, may be described as a nonprecipitated, coherent, rigid, three-dimensional network of contiguous particles of colloidal amorphous silica. The state of subdivision ranges from large, solid masses to submicroscopic particles, and the degree of hydration from almost anhydrous silica to soft gelatinous masses containing on the order of 100 parts of water per part of silica by weight, although the highly hydrated forms are only rarely used in the present invention.

Precipitated silica is usually produced commercially by combining an aqueous solution of a soluble metal silicate, ordinarily alkali metal silicate such as sodium silicate, and an acid so that colloidal particles will grow in weakly alkaline solution and be coagulated by the alkali metal ions of the resulting soluble alkali metal salt. Various acids may be used, including the mineral acids and carbon dioxide. In the absence of a coagulant, silica is not precipitated from solution at any pH. The coagulant used to effect precipitation may be the soluble alkali metal salt produced during formation of the colloidal silica particles, it may be added electrolyte such as a soluble inorganic or organic salt, or it may be a combination of both.

Precipitated silica, then, may be described as precipitated aggregates of ultimate particles of colloidal amorphous silica that have not at any point existed as macroscopic gel during the preparation. The sizes of the aggregates and the degree of hydration may vary widely.

Precipitated silica powders differ from silica gels that have been pulverized in ordinarily having a more open structure, that is, a higher specific pore volume. However, the specific surface area of precipitated silica as measured by the Brunauer, Emmet, Teller (BET) method using nitrogen as the adsorbate, is often lower than that of silica gel.

Many different precipitated silicas may be employed in the present invention, but the preferred precipitated silicas are those obtained by precipitation from an aqueous solution of sodium silldate sing a suitable acid such as sulfuric acid, hydrochloric acid, or carbon dioxide. Such precipitated silicas are themselves known and exemplary processes for producing them are described in detail in U.S. Pat. Nos. 2,657,149; 2,940,830; 4,681,750 and 5,094,829.

In the case of the preferred filler, precipitated silica, the average ultimate particle size (irrespective of whether or not the ultimate particles are agglomerated) is less than 0.1 micrometer as determinedby transmission electron microscopy. Often the average ultimate particle size is less than 0.05 micrometer. Preferably the average ultimate particle size of the precipitated silica is less than 0.03 micrometer.

The finely divided substantially water-insoluble filler particles constitute from 40 to 90 percent by weight of the microporous material. Frequently such filler particles constitute from 40 to 85 percent by weight of the microporous material. Often the finely divided substantially water-insoluble filler particles constitute from 50 to 90 percent by weight of the microporous material. In many cases the finely divided substantially water-insoluble filler particles constitute from 50 to 85 percent by weight of the microporous material. From 60 percent to 80 percent by weight is preferred.

At least 50 percent by weight of the finely divided substantially water-insoluble filler particles are finely divided substantially water-insoluble siliceous filler particles. In many cases at least 65 percent by weight of the finely divided substantially water-insoluble filler particles are siliceous. Often at least 75 percent by weight of the finely divided substantially water-insoluble filler particles are siliceous. Frequently at least 85 percent by weight of the finely divided substantially water-insoluble filler particles are siliceous. In many instances all of the finely divided substantially water-insoluble filler particles are siliceous.

Minor amounts, usually less than 5 percent by weight, of other materials used in processing such as lubricant, processing plasticizer, organic extraction liquid, water, and the like, may optionally also be present. Yet other materials introduced for particular purposes may optionally be present in the microporous material in small amounts, usually less than 15 percent by weight. Examples of such materials include antioxidants, ultraviolet light absorbers, reinforcing fibers such as chopped glass fiber strand, dyes, pigments, and the like. The balance of the microporous material, exclusive of filler and any coating, printing ink, or impregnant applied for one or more special purposes is essentially the thermoplastic organic polymer.

On a coating-free, printing ink free, impregnant-free, and pre-bonding basis, pores constitute from 35 to 80 percent by volume of the microporous material when made by the above-described process. In many cases the pores constitute from 60 to 75 percent by volume of the microporous material. As used herein and in the claims, the porosity (also known as void volume) of the microporous material, expressed as percent by volume, is determined according to the equation:

$$\text{Porosity} = 100[1 - d_1/d_2]$$

where $d_1$ is the density of the sample which is determined from the sample weight and the sample volume as ascertained from measurements of the sample dimensions and $d_2$ is the density of the solid portion of the sample which is determined from the sample weight and the volume of the solid portion of the sample. The volume of the solid portion of the same is determined using a Quantachrome stereopycnometer (Quantachrome Corp.) in accordance with the accompanying operating manual.

The volume average diameter of the pores of the microporous material is determined by mercury porosimetry using an Autoscan mercury porosimeter (Quantachrome Corp.) in accordance with the accompanying operating manual. The volume average pore radius for a single scan is automatically determined by the porosimeter. In operating the porosimeter, a scan is made in the high pressure range (from about 138 kilopascals absolute to about 227 megapascals absolute). If about 2 percent or less of the total intruded volume occurs at the low end (from about 138 to about 250 kilopascals absolute) of the high pressure range, the volume average pore diameter is taken as twice the volume average pore radius determined by the porosimeter. Otherwise, an additional scan is made in the low pressure range (from about 7 to about 165 kilopascals absolute) and the volume average pore diameter is calculated according to the equation:

$$d = 2\left[\frac{v_1 r_1}{w_1} + \frac{v_2 r_2}{w_2}\right] / \left[\frac{v_1}{w_1} + \frac{v_2}{w_2}\right]$$

where d is the volume average pore diameter, $v_1$ is the total volume of mercury intruded in the high pressure range, $v_2$ is the total volume of mercury intruded in the low pressure range, $r_1$ is the volume average pore radius determined from the high pressure scan, $r_2$ is the volume average pore radius determined from the low pressure scan, $w_1$ is the weight of the sample subjected to the high pressure scan, and $w_2$ is the weight of the sample subjected to the low pressure scan. Generally on a coating-free, printing ink-free, impregnant-free, and prebonding basis the volume average diameter of the pores is in the range of from 0.02 to 0.5 micrometer. Very often the volume average diameter of the pores is in the range of from 0.04 to 0.3 micrometer. From 0.05 to 0.25 micrometer is preferred.

In the course of determining the volume average pore diameter by the above procedure, the maximum pore radius detected is sometimes noted. This is taken from the low pressure range scan if run; otherwise it is taken from the high pressure range scan. The maximum pore diameter is twice the maximum pore radius.

Inasmuch as some coating processes, printing processes, impregnation processes and bonding processes result in filling at least some of the pores of the microporous material and since some of these processes irreversibly compress the microporous material, the parameters in respect of porosity, volume average diameter of the pores, and maximum pore diameter are determined for the microporous material prior to application of one or more of these processes.

Many processes are known for producing the microporous materials which may be employed in the present invention. Such processes are exemplified by those described in the patents, patent application, and international patent publication earlier referenced.

Preferably filler particles, thermoplastic organic polymer powder, processing plasticizer and minor amounts of lubricant and antioxidant are mixed until a substantially uniform mixture is obtained. The weight ratio of filler to polymer powder employed in forming the mixture is essentially the same as that of the microporous material to be produced. The mixture, together with additional processing plasticizer, is introduced to the heated barrel of a screw extruder. Attached to the extruder is a sheeting die. A continuous sheet formed by the die is forwarded without drawing to a pair of heated calender rolls acting cooperatively to form continuous sheet of lesser thickness than the continuous sheet exiting from the die. The continuous sheet from the calender then passes to a first extraction zone where the processing plasticizer is substantially removed by extraction with an organic liquid which is a good solvent for the processing plasticizer, a poor solvent for the organic polymer, and more volatile than the processing plasticizer. Usually, but not necessarily, both the processing plasticizer and the organic extraction liquid are substantially immiscible with water. The continuous sheet then passes to a second extraction zone where the residual organic extraction liquid is substantially removed by steam and/or water. The continuous sheet is then passed through a forced air dryer for substantial removal of residual water and remaining residual organic extraction liquid. From the dryer the continuous sheet, which is microporous material, is passed to a take-up roll.

The processing plasticizer has little solvating effect on the thermoplastic organic polymer at 60° C., only a moderate solvating effect at elevated temperatures on the order of 100° C., and a significant solvating effect at elevated temperatures on the order of 200° C. It is a liquid at room temperature and usually it is processing oil such as paraffinic oil, naphthenic oil, or aromatic oil. Suitable processing oils include those meeting the requirements of ASTM D 2226-82, Types 103 and 104. Preferred are oils which have a pour point of less than 22° C. according to ASTM D 97-66 (reapproved 1978). Particularly preferred are oils having a pour point of less than 10° C. Examples of suitable oils include Shellflex ® 412 and Shellflex ® 371 oil (Shell Oil Co.) which are solvent refined and hydrotreated oils derived from naphthenic crude. Further examples of suitable oils include ARCOprime ® 400 oil (Atlantic Richfield Co.) and Kaydole ® oil (Witco Corp.) which are white mineral oils. It is expected that other materials, including the phthalate ester plasticizers such as dibutyl phthalate, bis(2-ethylhexyl) phthalate, diisodecyl phthalate, dicyclohexyl phthalate, butyl benzyl phthalate, and ditridecyl phthalate will function satisfactorily as processing plasticizers.

There are many organic extraction liquids that can be used. Examples of suitable organic extraction liquids include 1,1,2-trichloroethylene, perchloroethylene, 1,2-dichloroethane, 1,1,1-trichloroethane, 1,1,2-trichloroethane, methylene chloride, chloroform, 1,1,2-trichloro-1,2,2-trifluoroethane, isopropyl alcohol, diethyl ether, acetone, hexane, heptane, and toluene.

In the above described process for producing microporous material, extrusion and calendering are facilitated when the substantially water-insoluble filler particles carry much of the processing plasticizer. The capacity of the filler particles to absorb and hold the processing plasticizer is a function of the surface area of the filler. It is therefore preferred that the filler have a high surface area. High surface area fillers are materials of very small particle size, materials having a high degree of porosity or materials exhibiting both characteristics. Usually the surface area of at least the siliceous filler particles is in the range of from 20 to 400 square meters per gram as determined by the Brunauer, Emmett, Teller (BET) method according to ASTM C 819-77 using nitrogen as the adsorbate but modified by outgassing the system and the sample for one hour at 130° C. Preferably the surface area is in the range of from 25 to 350 square meters per gram. Preferably, but not necessarily, the surface area of any non-siliceous filler particles used is also in at least one of these ranges.

Inasmuch as it is desirable to essentially retain the filler in the microporous material, it is preferred that the substantially water-insoluble filler particles be substantially insoluble in the processing plasticizer and substantially insoluble in the organic extraction liquid when microporous material is produced by the above process.

The residual processing plasticizer content is usually less than 10 percent by weight of the microporous sheet and this may be reduced even further by additional extractions using the same or a different organic extraction liquid. Often the residual processing plasticizer content is less than 5 percent by weight of the microporous sheet and this may be reduced even further by additional extractions.

On a coating-free, printing ink free, impregnant-free, and pre-bonding basis, pores constitute from 35 to 80 percent by volume of the microporous material when made by the above-described process. In many cases the pores constitute from 60 to 75 percent by volume of the microporous material.

The volume average diameter of the pores of the microporous material when made by the above-described process, is usually in the range of from 0.02 to 0.5 micrometer on a coating-free, printing ink-free, impregnant-free, and pre-bonding basis. Frequently the average diameter of the pores is in the range of from 0.04 to 0.3 micrometer. From 0.05 to 0.25 micrometer is preferred.

Microporous material may also be produced according to the general principles and procedures of U.S. Pat. Nos. 2,772,322; 3,696,061; and/or 3,862,030 These principles and procedures are particularly applicable where the polymer of the matrix is or is predominately poly(vtnyl chloride) or a copolymer containing a large proportion of polymerized vinyl chloride.

The microporous material produced by the above-described processes may optionally be stretched. It will be appreciated that the stretching both increases the void volume of the material and induces regions of molecular orientation. As is well known in the art, many of the physical properties of molecularly oriented thermoplastic organic polymer, including tensile strength, tensile modulus, Young's modulus, and others, differ considerably from those of the corresponding thermoplastic organic polymer having little or no molecular orientation.

Stretching may be accomplished in a single step or a plurality of steps as desired. For example, when the microporous material is to be stretched in a single direction (uniaxial stretching), the stretching may be accomplished by a single stretching step or a sequence of stretching steps until the desired final stretch ratio is attained. Similarly, when the microporous material is to be stretched in two directions (biaxial stretching), the stretching can be conducted by a single biaxial stretching step or a sequence of biaxial stretching steps until the desired final stretch ratios are attained. Biaxial stretching may also be accomplished by a sequence of one of more uniaxial stretching steps in one direction and one or more untaxial stretching steps in another direction. Biaxial stretching steps where the microporous material is stretched simultaneously in two directions and uniaxial stretching steps may be conducted in sequence in any order. Stretching in more than two directions is within contemplation. It may be seen that the various permutations of steps are quite numerous. Other steps, such as cooling, heating, sintertng, annealing, reeling, unreeling, and the like, may optionally be included in the overall process as desired.

Stretched microporous material may be produced by stretching the unstretched microporous material in at least one stretching direction above the elastic limit. Usually the stretch ratio is at least 1.5. In many cases the stretch ratio is at least 1.7. Preferably it is at least 2. Frequently the stretch ratio is in the range of from 1.5 to i5. Often the stretch ratio is in the range of from 1.7 to 10. Preferably the stretch ratio is in the range of from 2 to 6. As used herein, the stretch ratio is determined by the formula:

$$S=L_2/L_1$$

where S is the stretch ratio, $L_1$ is the distance between two reference points located on the unstretched microporous material and on a line parallel to the stretching direction, and $L_2$ is the distance between the same two reference points located on the stretched microporous material.

The temperatures at which stretching is accomplished may vary widely. Stretching may be accomplished at ambient room temperature, but usually elevated temperatures are employed. In most cases, the film surface temperatures during stretching are in the range of from 20° C. to 220° C. Often such temperatures are in the range of from 50° C. to 200° C. From 75° C. to 180° C. is preferred.

Various types of stretching apparatus are well known and may be used to accomplish stretching of the mlcroporous material.

After stretching has been accomplished, the microporous material may optionally be sintered, annealed, heat set and/or otherwise heat treated. During these optional steps, the stretched microporous material is usually held under tension so that it will not markedly shrink at the elevated temperatures employed, although some relaxation amounting to a small fraction .of the maxime stretch ratio is frequently permitted.

Following stretching and any heat treatments employed, tension is released from the stretched microporous material after the mlcroporous material has been brought to a temperature at which, except for a small amount of elastic recovery amounting to a small fraction of the stretch ratio, it is substantially dimensionally stable in the absence of tension. Elastic recovery under these conditions usually does not amount to more than 10 percent of the stretch ratio.

Stretching is preferably accomplished after substantial removal of the processing plasticizer as described above. For purposes of this invention, however, the calendered sheet may be stretched in at least one stretching direction followed by substantial removal of the residual organic extraction liquid. It will be appreciated that as stretching may be accomplished in a single step or a plurality of steps, so likewise extraction of the processing plasticizer may be accomplished in a single step or a plurality of steps and removal of the residual organic extraction liquid may be accomplished in a single step or a plurality of steps. The various combinations of the steps stretching, partial stretching, processing plasticizer extraction, partial plasticizer extraction, removal of organic extraction liquid, and partial removal of organic extraction liquid are very ntunerous, and may be accomplished in any order, provided of course, that a step of processing plasticizer extraction (partial or substantially complete) precedes the first step of residual organic extraction liquid removal (partial or substantially complete). It is expected that varying the orders and numbers of these steps will produce variations in a least some of the physical properties of the stretched microporous product.

In all cases, the porosity of the stretched microporous material is, unless coated, printed, impregnated, or bonded after stretching, greater than that of the unstretched microporous material. On a coating-free, printing ink-free, impregnant-free, and pre-bonding basis, pores usually constitute more than 80 percent by volume of the stretched microporous material. In many instances the pores constitute at least 85 percent by volume of the stretched microporous material. Often the pores constitute from more than 80 percent to 95 percent by volume of the stretched microporous material. From 85 percent to 95 percent by volume is preferred.

Generally on a coating-free, printing ink-free, impregnant-free, and pre-bonding basis the volume average diameter of the pores of the stretched microporous material is in the range of from 0.6 to 50 micrometers. Very often the volume average diameter of the pores is in tile range of from 1 to 40 micrometers. From 2 to 30 micrometers is preferred.

The microporous material of the invention, whether stretched or unstretched, may be prepared by including the whiteness retaining organic surface active agent in the ingredients used to form the microporous material.

Alternatively, the whiteness retaining organic surface active agent is applied topically to precursor microporous material which has already been formed. This may be accomplished in various ways, as for example, by applying a composition comprising whiteness retaining organic surface active agent dissolved or dispersed in liquid diluent onto the microporous material and then removing the liquid diluent. The application may be made in many ways, as for example by spraying, dipping, roll coating, and the like. Spraying is preferred. The liquid diluent is preferably water, although inert organic liquid diluent can be used when desired. The composition is preferably a solution, but a dispersion or emulsion can be used. Other surface active agents may optionally be present.

The microporous material of the invention may optionally be coated, impregnated, and/or printed with a wide variety of coating compositions, impregnating compositions, and/or printing inks using a wide variety of coating, impregnating, and/or printing processes. The coating compositions, coating processes, impregnating compositions, impregnation processes, printing inks, and printing processes are themselves conventional. The printing, impregnation, and coating of microporous material are more fully described in U.S. Pat. Nos. 4,861,644; 5,032,450; and 5,047,283.

The invention is further described in conjunction with the following examples which are to be considered illustrative rather than limiting.

DESCRIPTION OF TEST METHODS

Cigarette Smoke Exposure Test

A 2-liter resin kettle served as a cigarette smoke exposure chamber. The bottom of the kettle was equipped with an outlet and stopcock. The stopcock was attached to a source of aspirator vacuum. The lid of the kettle had both a central hole and an off-center 20/40 gas inlet tube. A cork having a hook was placed in the central hole of the lid such that the hook was positioned within the chamber. A short piece of Tygon ® tubing which could hold a cigarette was fitted to the gas inlet.

A 2.54 centimeter × 12.7 centimeter sample was dried by placing it in a convection air oven at 105° C. for from 1 to 5 minutes. The dried sample was hung from the hook so that the dried sample was suspended in the middle of the chamber. The filter end of a standard length filter cigarette was placed in the tubing and air was drawn through the cigarette into the chamber by the aspirator vacuum The cigarette was lit and it burned down in about one minute. The air flow was stopped by closing the stopcock at the bottom of the resin kettle and the sample was exposed for an additional 4 minutes (5 minutes total exposure to smoke). The sample was removed to a convection oven at 105° C. for 1 minute to "set" the stain. A discoloration rating was assigned to each smoke chamber exposed sample with 10 being no visible change and 0 being extreme discoloration. The control sample, Example 1, was assigned a rating of 1.

EXAMPLES OF INTERNAL ADDITION OF WHITENESS RETAINING COMPOUNDS

Preparation of Two Roll Mill Samples

Laboratory samples were prepared by mixing together the ingredients listed in Table 2. Numbers in parentheses refer to the footnotes which appear at the end of Table 2. Surface active agents are identified by an abbreviation of the form SAA-x where x is a number. All solids were weighed into a glass beaker and then the indicated amount of processing oil was added. The materials were blended with a spatula to form a paste. The paste was preheated to 105° C. in an air oven for from 30 to 90 minutes.

Sheet samples were prepared on a C. W. Brabender Prep Mill, Type PM-3000, two-roll laboratory mill using 170° C. roll temperature, a 0.96 millimeter gap, and a drive speed of 20 revolutions per minute. The warmed paste was added to the nip of the mill. For the mixtures of some examples a slower drive speed was used initially to facilitate early mixing of the ingredients. The polyethylenes were allowed to melt and the mixture was consolidated to a uniform sheet with a rolling bank. The sample was mixed by making cuts from one side to one-half to three-quarters across the sheet and folding the trailing flap back onto the uncut portion. Further cuts were made alternating from the edge from which the initial cut was made and the trailing flap was folded back onto the uncut portion. After the sample was mixed, the mill speed was slowed to 10 revolutions per minute and allowed to run for a short while in order to minimize any orientation effects caused by the mill. The slow speed also aided in removing the sheet from the mill. The mill was stopped. The sheet on the mill roll was cut near the nip entrance, a 2 to 3 centimeter flap was loosened from the roll and held on a piece of paper towel. The mill was restatted and the sheet was removed as one continuous piece. The sheet sample was placed on a stainless steel covered stone bench top to cool.

A portion of the oil-filled sheet was pressed to approximately 250 micrometers thickness in a 30 ton Carver hydraulic press with 30.5 centimeter×30.5 centimeter heated platens. Eight to twelve grams of oil-filled sample was placed on a 30.5 centimeter ×30.5 centimeter piece of 125 micrometer thick aluminum foil in the center of a 250 micrometer thick frame with an opening about 23 centimeters×23 centimeters. A second piece of foil was placed over the sample in the frame and the "mold" was placed in the press which had been preheated to 186° C. The platens were closed to touch the sample without applying force and the sample was preheated for 3 minutes. The force was then raised to load of 178 kilonewtons and maintained for 1 minute. The mold was removed from the press and cooled with the sample by placing on a stone bench top. The pressed sample was removed from the foil mold and a circle 175 millimeters in diameter was cut from the pressed sheet.

The process oil was extracted by soaking the circular sheet in about 100 milliliters of trichloroethylene in a 190 millimeter×100 millimeter crystallizing dish for 5 minutes. The solvent was poured off of the sample and the soaking step was repeated with a fresh 100 milliliter portion of trichloroethylene. The sample was removed from the extraction bath and allowed to air dry for a minimum of 3 hours in a fume hood. Samples 25 millimeters ×125 millimeters were cut from the dried, extracted sheet and tested in the smoke chamber as described above. The formulations and results of cigarette smoke testing are shown in Table 2.

TABLE 2

| Example No. | 1 | 2 | 3 | 4 | 5 | 6 |
|---|---|---|---|---|---|---|
| UHMWPE (1), g | 5.73 | 5.73 | 5.73 | 5.73 | 5.73 | 5.73 |
| HDPE (2), g | 8.60 | 8.60 | 8.60 | 8.60 | 8.60 | 8.60 |
| Silica (3), g | 28.67 | 28.67 | 28.67 | 28.67 | 28.67 | 28.67 |
| SAA-1 (4), g | 0 | 2.15 | 0 | 0 | 0 | 0 |
| SAA-2 (5), g | 0 | 0 | 2.15 | 0 | 0 | 0 |
| SAA-3 (6), g | 0 | 0 | 0 | 2.15 | 0 | 0 |
| SAA-4 (7), g | 0 | 0 | 0 | 0 | 2.15 | 0 |
| SAA-5 (8), g | 0 | 0 | 0 | 0 | 0 | 2.15 |
| TiO$_2$ (9), g | 0.57 | 0.57 | 0.57 | 0.57 | 0.57 | 0.57 |
| Antioxidant (10), g | 0.05 | 0.05 | 0.05 | 0.05 | 0.05 | 0.05 |
| Lubricant (11), g | 0.3 | 0.3 | 0.3 | 0.3 | 0.3 | 0.3 |
| Process Oil (12), g | 57.00 | 57.00 | 57.00 | 57.00 | 57.00 | 57.00 |
| Discoloration Rating | 1 | 3 | 9 | 9 | 3 | 8 |

Notes:
(1) UHMWPE = Ultra High Molecular Weight Polyethylene, Himont ® 1900, Himont Corp.
(2) HDPE = High Density Polyethylene, Hostalene ® GM9255S, Hoechst-Celanese Corp.
(3) Hi-Sil ® SBG Preceipitated Silica, PPG Industries, Inc.
(4) SAA-1 = N,N-bis(2-hydroxyethyl)cocoamide.
(5) SAA-2 = Larostat ® HTS 905 Octyl-dimethyl-2-hydroxyethyl quaternary ammonium sulfonate, PPG Industries, Inc.
(6) SAA-3 = Larostat ® HTS 906 Octyl-dimethyl-2-hydroxyethyl quaternary ammonium dodecylbenzene sulfonate, PPG Industries, Inc.
(7) SAA-4 = Larostat ® 264A Soya dimethyl ethyl ammonium ethosulfate, PPG Industries, Inc.
(8) SAA-8 = Mapeg ® 400ML Polyethyleneglycol (400) Monolaurate, PPG Industries, Inc.
(9) TiO$_2$ = Ti-Pure ®'R-960 Titanium Dioxide, DuPont.
(10) Irganox ® 1010, Ciba-Geigy Corp.
(11) Petrac ® CZ-81, Synpro Corp.
(12) AcroPrime ® 400, Lyondell Petroleum Corp.

The data show that the presence of whiteness retaining organic surface active agent served to reduce discoloration induced by cigarette smoke.

Preparation of Roll Samples

The preparation of microporous materials is illustrated by the following seven descriptive examples. Processing oil was used as the processing plasticizer.

The material identified as SAA-6 is an organic surface active agent. Silica, polymer, lubricant, titanium dioxide, antioxidant, and, when used, organic surface active agent, in the amounts specified in Table 3 were placed in a high intensity mixer and mixed at high speed for 6 minutes. The processing oil needed to formulate the batch was pumped into the mixer over a period of from 3 to 5 minutes with high speed agitation. After completion of the processing oil addition, a 6 minute-high speed mix period Was used to complete the distribution of the processing oil uniformly throughout the mixture.

The mixture was conveyed to a feeder hopper and feed to a twin screw extruder by a variable rate screw feeder. Additional processing oil was added via metering pump which injected the oil downstream of the feed port in a "low pressure" region of the screw. The extruder mixed and melted the formulation and extruded it through a slot die having a slot width of 196 centimeters and a slot thickness adjustable in the range of from 0.15 centimeter to 0.30 centimeter. The extruded sheet was then calendered. A description of one type of calender that may be used may be found in the U.S. Pat. No. 4,734,229, including the structures of the devices and their modes of operation. Other calenders of different design may alternatively be used; such calenders and their modes of operation are well known in the art. The hot, calendered sheet was then passed around a chill roll to cool the sheet. The rough edges of the cooled calendered sheet were trimmed by rotary knives to the desired width.

The oil filled sheet was conveyed to the extractor unit where it was contacted by both liquid and vaporized 1,1,2-trichloroethylene (TCE). The sheet was transported over a series of rollers in a serpentine fashion to provide multiple, sequential vapor/liquid/vapor contacts. The extraction liquid in the sump was maintained at a temperature of from 65° to 88° C. Overflow from the sump of the TCE extractor was returned to a still which recovered the TCE and the processing oil for reuse in the process. The bulk of the TCE was extracted from the sheet by steam as the sheet was passed through a second extractor unit. A description of these types of extractors may be found in U.S. Pat. No. 4,648,417, including especially the structures of the devices and their modes of operation. The sheet was dried by radiant heat and convective air flow in a drying oven. The dried sheet was wound on cores to provide roll stock for further processing. Samples of the resulting microporous sheets were tested in the smoke chamber as described above. The formulations and the results of cigarette smoke testing are shown in Table 3.

TABLE 3

| Example No. | 7 | 8 | 9 | 10 | 11 | 12 | 13 |
|---|---|---|---|---|---|---|---|
| UHMWPE (1), kg | 17.0 | 17.9 | 17.9 | 28.6 | 17.0 | 17.9 | 28.6 |
| HDPE (2), kg | 20.8 | 21.9 | 21.9 | 39.5 | 20.8 | 21.9 | 39.5 |
| Silica (3), kg | 93.1 | 93.4 | 93.8 | 125.9 | 94.2 | 94.2 | 125.9 |
| SAA-6 (4), kg | 4.4 | 3.4 | 2.2 | 16.1 | 0 | 0 | 0 |
| $TiO_2$ (5), kg | 1.84 | 1.84 | 1.84 | 2.45 | 1.84 | 1.84 | 2.45 |
| Antioxidant (6), kg | 0.31 | 0.31 | 0.31 | 0.41 | 0.31 | 0.31 | 0.41 |
| Lubricant (7), kg | 0.92 | 0.92 | 0.92 | 1.23 | 0.92 | 0.92 | 1.23 |
| Process Oil (8), kg | | | | | | | |
| Added to Mixer | 141.2 | 141.7 | 142.2 | 190.9 | 142.9 | 142.9 | 190.9 |
| Added at Extruder | 76.4 | 65.5 | 70.9 | 60.0 | 70.9 | 70.9 | 60.0 |
| Thickness, mm | 0.229 | 0.237 | 0.241 | 0.146 | 0.247 | 0.255 | 0.152 |
| Discoloration Rating | 8 | 7 | 7 | 9 | 1 | 1 | 1 |

Notes:
(1) UHMWPE = Himont 1900 Ultra High Molecular Weight Polyethylene, Himont Corp.
(2) HDPE = Hostalen ® GM9255S High Density Polyethylene, Hoechst-Celanese Corp.
(3) Hi-Sil ® SBG Precipitated Silica, PPG Industries, Inc.
(4) SAA-6 = Larostat HTS-905S 60 wt % Octyl-dimethyl-2-hydroxyethyl quaternary ammonium methane sulfonate on 40 wt % Hi-Sil ® ABS Precipitated Silica, PPG Industries, Inc.
(5) $TiO_2$ = Ti-Pure ® R-960 Titanium Dioxide, DuPont.
(6) Irganox ® 1010 Antioxidant, Ciba-Geigy Corp.
(7) Petrac CZ-81 Lubricant, Synpro Corp.
(8) AcroPRIME ® 400 Oil, Lyondell Petroleum Corp.

The data show that the presence of whiteness retaining organic surface active agent served to reduce discoloration induced by cigarette smoke.

Examples of Topical Addition of Whiteness Retaining Compounds

EXAMPLES 14-21

Topical applications were achieved by preparation of coating solutions of the various additives which were applied to samples of the microporous material of Example 12 by drawdown coating. Solutions were prepared by dissolving 3 grams of each organic surface active agent in 50 milliliters of water and 1 milliliter of methyl alcohol. A 21.6 centimeter×27.9 centimeter sheet of the microporous material of Example 12 was placed on a levelled Model II CSD Laboratory Drawdown Machine (Consler Scientific Co.) A strip of Scotch ® 810 clear tape was placed across the sample positioned so that the wire wound rod could be drawn over the tape band and down the length of the sheet sample. A 2 to 3 milliliter aliquot of surface active agent solution was distributed along the tape band and the liquid was drawn over the sample by pulling a #10 wire wound rod over the tape and down the length of the sheet. The sheet was removed from the drawdown machine and placed in a 105° C. air oven for 10 to 15 minutes to remove excess water. Test samples 25 millimeters×125 millimeters in size were cut from the center area of the dried sheet and tested in the cigarette smoke test. The treated side of the sample was rated for discoloration. The identities of the organic surface active agents and the results are shown in Table 4.

TABLE 4

| Example | Antistat | Discoloration Rating |
|---|---|---|
| 14 | SAA-1 (1) | 2-3 |
| 15 | SAA-2 (2) | 9 |
| 16 | SAA-4 (3) | 6 |
| 17 | SAA-5 (4) | 8 |
| 18 | SAA-7 (5) | 8 |
| 19 | SAA-8 (6) | 1 |
| 20 | SAA-9 (7) | 8 |
| 21 | SAA-10 (8) | 7 |

Notes:
(1) SAA-1 = N,N-bis(2-hydroxyethyl)cocoamide.
(2) SAA-2 = Larostat ® HTS 905 Octyl-dimethyl-2-hydroxyethyl quaternary ammonium methane sulfonate, PPG Industries, Inc.
(3) SAA-4 = Larostat ® 264A Soya dimethyl ethyl ammonium ethosulfate, PPG Industries, Inc.
(4) SAA-5 = Mapeg ® 400ML Polyethyleneglycol (400) Monolaurate, PPG Industries, Inc.
(5) SAA-7 = Larostat ® 96 Stearamidopropyl dimethyl-2-hydroxyethyl ammonium nitrate, PPG Industries, Inc.
(6) SAA-8 = Larostat ® 265-199 Dodecyl phosphate ester, PPG Industries, Inc.
(7) SAA-9 = Jordaquat ® 358 Dimethyl cocobenzalkonium chloride, PPG Industries, Inc.
(8) SAA-10 = Mazox ® LDA Lauramine oxide, PPG Industries, Inc.

EXAMPLE 22

A coating solution was prepared by mixing 3 grams of Larostat ® HTS 905 octyl-dimethyl-2-hydroxyethyl quaternary ammonium methane sulfonate (an organic surface active agent; PPG Industries, Inc.) and 1 gram of Surfynol ® ethoxylated 2,4,7,9-tetramethyl-5-decyne-4,7-diol (a surfactant; Air Products and Chemicals, Inc.) in 100 milliliters of water. A sample of the microporous material of Example 12 was coated and tested in the smoke chamber as described for Examples 14-21. The coated side of the sheet received a discoloration rating of 9.

EXAMPLES 23-25

Microporous sheet was prepared as described in Example 11 except that the sheet thickness was 0.356 millimeter. During the production process a Binks No. 7 pressure paint spray gun was used to apply 0.3 kilogram per minute of additive formulation to a 25 centimeter wide region of the microporous material web which was moving at 9.1 meters per minute. Approximately 0.45 kilogram per minute of the microporous sheet was coated on one side by the sprayed additive formulation.

The additive formulations used were prepared by admixing the materials shown in Table 5 for 15 to 30 minutes before use. In Example 23 the additive formulation was sprayed on the microporous sheet surface after the sheet had passed through the drying oven. In Example 24 the additive formulation was sprayed on the microporous sheet surface after the sheet had passed through the extractor unit but before it entered the drying oven. The microporous sheet in Example 25 was untreated. Samples of the treated and untreated microporous sheets were tested in the cigarette smoke test. The treated side of the samples were rated for discoloration. The compositions of the sprayed additive formulations and the results are shown in Table 5.

TABLE 5

| Example No. | 23 | 24 | 25 |
|---|---|---|---|
| Additive Formulation | | | |
| SAA-2 (1), g | 15.2 | 45.0 | 0 |
| SAA-11 (2), g | 5.0 | 12.0 | 0 |
| Water, g | 1000.0 | 3000.0 | 0 |
| Application Rate, g SAA-2/g sheet | 0.01 | 0.01 | 0 |
| Discoloration Rating | 9 | 8 | 2 |

Notes:
(1) SAA-2 = Larostat ® HTS 905 Octyl-dimethyl-2-hydorxyethyl quaternary ammonium methane sulfonate. PPG Industries, Inc.
(2) SAA-11 = Surfynol ® 440 ethoxylated (3.5 moles) 2,4,7,9-tetramethyl-5-decyne-4,7-diol, Air Products and Chemicals, Inc.

Although the present invention has been described with reference to specific details of certain embodiments thereof, it is not intended that such details should be regarded as limitations upon the scope of the invention except insofar as they are included in the accompanying claims.

What is claimed is:

1. In microporous material which on a coating-free, printing ink-free, and impregnant-free basis comprises:
   (a) a matrix consisting essentially of substantially water insoluble thermoplastic organic polymer,
   (b) finely divided substantially water-insoluble filler particles, of which at least 50 percent by weight are siliceous particles, said filler particles being distributed throughout said matrix and constituting from 40 to 90 percent by weight of said microporous material, and
   (c) a network of interconnecting pores communicating substantially throughout said microporous material, said pores constituting from 35 to 95 percent by volume of said microporous material,
the improvement wherein said microporous material comprises whiteness retaining organic surface active agent selected from the group consisting of N,N-bis(2-hydroxyethyl)cocoamide, octyl-dimethyl-2-hydroxyethyl quaternary ammonium methane sulfonate, octyl-dimethyl-2-hydroxyethyl quaternary ammonium dodecylbenzene sulfonate, sofa dimethyl ethyl ammonium ethosulfate, polyethyleneglycol (400) monolaurate, stearamidopropyldimethyl-2-hydroxyethylammonium nitrate, dimethyl cocobenzalkonium chloride, and lauramine oxide.

2. The microporous material of claim 1 wherein said whiteness retaining organic surface active agent is an integral component of said microporous material.

3. The microporous material of claim 2 wherein said whiteness retaining organic surface active agent constitutes from 0.1 to 10 percent by weight of said microporous material.

4. The microporous material of claim 1 wherein said whiteness retaining organic surface active agent is topically applied whiteness retaining organic surface active agent.

5. The microporous material of claim 4 wherein said whiteness retaining organic surface active agent constitutes from 0.05 to 10 percent by weight of said microporous material.

6. The microporous material of claim 1 wherein said substantially water-insoluble thermoplastic organic polymer comprises essentially linear ultrahigh molecular weight polyolefin which is essentially linear ultrahigh molecular weight polyethylene having an intrinsic viscosity of at least 10 declitters/gram, essentially linear ultrahigh molecular weight polypropylene having an intrinsic viscosity of at least 6 declitters/gram, or a mixture thereof.

7. The microporous material of claim 6 wherein said essentially linear ultrahigh molecular weight polyolefin is essentially linear ultrahigh molecular weight polyethylene having an intrinsic viscosity of at least 18 deciliters/gram.

8. The microporous material of claim 7 wherein said filler particles constitute from 40 percent to 85 percent by weight of said microporous material.

9. The microporous material of claim 7 wherein said siliceous particles of said microporous material are silica particles.

10. The microporous material of claim 7 wherein said siliceous particles of said microporous material are precipitated silica particles.

11. The microporous material of claim 1 wherein said matrix comprises a mixture of substantially linear ultrahigh molecular weight polyethylene having an intrinsic viscosity of at least 10 deciliters/gram and lower molecular weight polyethylene having an ASTM D 1238-86 Condition E melt index of less than 50 grams/10 minutes and an ASTM D 1238-86 Condition F melt index of at least 0.1 gram/10 minutes.

12. The microporous material of claim 11 wherein said substantially linear ultrahigh molecular weight polyethylene constitutes at least one percent by weight of said matrix and said substantially linear ultrahigh molecular weight polyethylene and said lower molecular weight polyethylene together constitute substantially 100 percent by weight of the polymer of the matrix.

13. The microporous material of claim 12 wherein said lower molecular weight polyethylene is high density polyethylene.

14. The microporous material of claim 13 wherein said siliceous particles of said microporous material are precipitated silica particles.

15. The microporous material of claim 14 wherein said whiteness retaining organic surface active agent is N,N-bis(2-hydroxyethyl)cocoamide.

16. The microporous material of claim 14 wherein said whiteness retaining organic surface active agent is octyl-dimethyl-2-hydroxyethyl quaternary ammonium methane sulfonate.

17. The microporous material of claim 14 wherein said whiteness retaining organic surface active agent is octyl-dimethyl-2-hydroxyethyl quaternary ammonium dodecylbenzene sulfonate.

18. The microporous material of claim 14 wherein said whiteness retaining organic surface active agent is soya dimethyl ethyl ammonium ethosulfate.

19. The microporous material of claim 14 wherein said whiteness retaining organic surface active agent is polyethyleneglycol (400) monolaurate.

20. The microporous material of claim 14 wherein said whiteness retaining organic surface active agent is stearamldopropyldimethyl-2-hydroxyethylammonium nitrate.

21. The microporous material of claim 14 wherein said whiteness retaining organic surface active agent is dimethyl cocobenzalkonium chloride.

22. The microporous material of claim 14 wherein said whiteness retaining organic surface active agent is lauramine oxide.

* * * * *